United States Patent
Thirion et al.

(10) Patent No.: US 9,621,875 B2
(45) Date of Patent: Apr. 11, 2017

(54) DEVICE FOR THE ACQUISITION OF A STEREOSCOPY IMAGE PAIR

(71) Applicant: QUANTIFICARE S.A., Valbonne (FR)

(72) Inventors: Jean-Philippe Thirion, Valbonne (FR); Peter Plassmann, Pontypridd (GB)

(*) Notice: Subject to any disclaimer, the term of this patent is extended or adjusted under 35 U.S.C. 154(b) by 101 days.

(21) Appl. No.: 14/708,313

(22) Filed: May 11, 2015

(65) Prior Publication Data
US 2015/0358604 A1 Dec. 10, 2015

(30) Foreign Application Priority Data
Jun. 4, 2014 (FR) ...................................... 14 01282

(51) Int. Cl.
| | |
|---|---|
| *G03B 35/00* | (2006.01) |
| *H04N 13/02* | (2006.01) |
| *H04N 13/00* | (2006.01) |
| *G01C 11/02* | (2006.01) |
| *G03B 15/02* | (2006.01) |

(52) U.S. Cl.
CPC ......... *H04N 13/0239* (2013.01); *G01C 11/02* (2013.01); *G03B 15/02* (2013.01); *G03B 35/00* (2013.01); *H04N 13/0025* (2013.01); *H04N 13/0253* (2013.01)

(58) Field of Classification Search
USPC .......................................................... 396/324
See application file for complete search history.

(56) References Cited

U.S. PATENT DOCUMENTS

| | | | | |
|---|---|---|---|---|
| 7,493,037 B2* | 2/2009 | Inaba | ................. | H04N 13/0029 396/324 |
| 9,495,613 B2* | 11/2016 | Holz | .................... | G06K 9/6202 |
| 2002/0118970 A1* | 8/2002 | Miyoshi | ................ | G03B 35/00 396/324 |
| 2004/0081445 A1* | 4/2004 | Miyoshi | ............ | H04N 13/0217 396/324 |
| 2015/0156477 A1* | 6/2015 | Lee | ..................... | H04N 13/0257 348/46 |
| 2015/0192838 A1* | 7/2015 | Ishiyama | ............... | G03B 15/02 348/375 |
| 2015/0206023 A1* | 7/2015 | Kochi | .................... | G01B 11/00 382/199 |
| 2016/0007009 A1* | 1/2016 | Offenberg | ............. | G01S 17/023 348/46 |

* cited by examiner

*Primary Examiner* — Rodney Fuller

(57) ABSTRACT

A stereophotogrammetry device intended to reduce the 3D surface reconstruction artifacts due to specular reflections when a unique camera body is used. Indeed, specular reflection of the camera flash on shiny objects are creating virtual objects in the scene inducing spikes in reconstruction. The device is constituted of a computing unit (C) enabling 3D reconstruction, a unique camera body (5) equipped with a non-polarized double-optics (OA) and (OB) and two light sources (2A) and (2B) separated by the same distance as the double-optics and aligned with these such that (2A) is aligned with (OA) and (2B) is aligned with (OB) relative to the subject (S). According to geometry considerations, the computing unit (C) is defining the best matching amongst four possible matches relative to the specular spot position.

12 Claims, 5 Drawing Sheets

DEVICE FOR THE ACQUISITION OF A STEREOSCOPY IMAGE PAIR

BACKGROUND INFORMATION

The present invention relates to the field of three dimensional surface reconstruction from a stereoscopy pair of images called stereo pair. Each image of the stereo pair is acquired according to a different viewing angle. The human brain is able to process the stereo pair and mentally reconstruct three dimensions out of it.

Reconstructing a surface in three dimension from a stereo pair is called stereophotogrammetry. Stereophotogrammetry can be based on films or digital images and is extensively being used by cartographers to build topographic maps from aerial images. Through this technology, cartographers are computing level lines enabling the tracing of the relief on maps. Stereophotogrammetry is also used in many applications, including three dimensions reconstruction of industrial objects or skin surface reconstruction for cosmetic or medical applications.

Computers and photography digitizing permitted the development of digital image processing. Amongst the first application of digital image processing is semi-automatized or automatized reconstruction of a three-dimensional surface from a stereo pair. The book "Photogrammetry 1. Fundamentals and Standard Processes", $4^{th}$ edition, Karl Kraus and Peter Walrdhäusl, BonnDümmler editing, 1993 is an excellent introduction to the principles of 3D reconstruction in stereophotogrammetry via computers.

Principle of stereophotogrammetry, illustrated by FIG. 1, is to measure accurately the geometric characteristics and to model the optics OA and OB used to acquire the two images of the stereo pair. This step is called calibration. Once the optics are calibrated, by knowing the position PA and PB in each of the two images A and B of the same physical point position P of the surface of the subject S it defines exactly two lines in space whose intersection is the point P on the surface of the subject.

Computer-based stereophotogrammetry is therefore based on two main principles: the knowledge of the geometry of the optics via calibration and the matching of corresponding points in the two images of the stereo pair. A general method to identify corresponding points in both images is to use image cross-correlation, which is maximal when a small window around each point in the images of the stereo pair is compared.

In order to make the image acquisition system more compact for stereophotogrammetry, devices have been developed in order to acquire the two images of the stereo pair by using a single camera body instead of two independent camera bodies.

One way to build such a compact image acquisition system is described in FIG. 2. The device is based on a single camera body 5 and an image splitter constructed with mirrors and enabling the split of the image received by the optical system. For such purpose, one would generally use two external mirrors 1A and 1B, called "secondary mirrors" and spaced at approximately the same distance as human eyes and two internal mirrors 3A and 3B, opposite to the external ones, called "primary mirrors" and which are reflecting the image toward an optical system 4. As natural light conditions are generally not enough for photographic needs, a powerful light system 2 is added on top of the camera.

Such a system, constituted of a camera, a unique flash and an image splitter has been designed by one of the co-authors and is described in the publication: "MAVIS: a non-invasive instrument to measure area and volume of wounds. Measurement of Area and Volume Instrument System", Plassmann P, Jones T D, Med Eng Phys 1998; 20(5):332-8. FIG. 2 is presenting a device based on an image splitter close to the one used by the authors of this publication.

Another way to build a stereophotogrammetry system using a single body camera is to use two sets of independent lenses for each of the two images to acquire. Such a system, consisting of a camera body, a unique flash and two independent sets of lenses has been designed by the FUJI Company and commercialized under the name of FUJI FinePix 3D W3. FIG. 3 is describing a system based on two independent sets of lenses with the subject S, the camera body 5, the two independent sets of lenses OA and OB and a unique flash 2.

Such systems based on a unique camera body are generally leading to good 3D surface reconstruction except when the surface is reflecting too much the flash light: a phenomenon called "specular reflection".

A physical surface is reflecting light in two different ways: on one side "diffusion" and on the other side "specular reflection". Diffusion consists in reflecting received light in a uniform way in space, independently from the incidence angle of the light. Diffusion is specific to mate surfaces. The second way to reflect light is to do it in the same way as a mirror which follows the Snell-Descartes law for light reflection. Such mirror reflection is present in the case of shiny surfaces. Suppose we call the locus of reflection of the light source on a shiny object a "specular spot" as the light source has a given extension and as material property of reflecting surfaces are concentrating more or less the light in the reflection direction, creating a spot rather than a single point.

Specular reflection is creating an issue for 3D surface reconstruction algorithms as the specular spot observed in each of the two optics is shifted between left and right images of the stereo pair in such a way that the method used to find corresponding points is defining a point which is not within the surface to reconstruct but farther away.

In the case of a convex curved surface, the specular spot is reconstructed at a position corresponding to the virtual position of the flash as it is reflected by the shiny surface. It is placed between the surface and up to two times the distance between the surface and the flash depending upon surface curvature. Hence, the point corresponding to the maximal correlation is the mirror image of the flash on the reflecting surface, which is creating an artificial spike oriented backward relative to the surface at the level of the specular spot.

FIG. 4 is describing this geometric phenomenon in the case of a convex shiny object such as a sphere and what happens in the case of a unique camera body 5 with a unique light source 2 and a double optics OA and OB. The light source 2 is creating a specular spot seen at different places of the surface of the sphere by optics OA and optics OB, which is moving the estimated surface reconstructed to P', that is, backward relative to the subject S surface and not within the surface itself.

A way to reduce the specular effect is to use frosted glass on the flash, which is enlarging and diffusing the specular spot more. However, except when reducing the intensity of the flash by a large amount, the specular spot remains visible and is generally creating a reconstruction artefact.

Another way to reduce the specular effect is to use cross-polarization. Polarization action on light is similar to a "comb". If one is holding two combs in a parallel way, one on top of each other, one would see through the combs. However, if one is holding these two combs in a perpendicular way, then the light is blocked and one would not be able to see through them. Diffuse reflection is much less sensitive to polarization than specular reflection because specular reflection is reflecting light with exactly the same polarization orientation as incident light. By using a directional polarizing filter on the flash and a polarizing filter with perpendicular orientation on the two optics, one would eliminate most of the specular reflection in the two images of the stereo pair.

Such a technique of cross-polarization has been used by the authors in a previous version of the system. Unfortunately, cross-polarization is removing much of the light and in the example of images of the human skin, they tend to be far from being natural as polarization intensifies the redness of the skin. Another way to avoid such an issue, still with polarization, would be to use two independent flashes and as designed by the authors, consists in using an "inverted" cross polarization between the flashes and the optics, in such a way that the left flash is illuminating the right optics and the right flash is illuminating the left optics. For more details, refer to the English patent application GB 2 468 138 A (UGSC [GB]), Sep. 2010 1 (2010-09-01). This principle of inverted cross polarization has been used in the 3D LifeViz camera as it is presented in HANS SKVARA ET AL: <<Quantification of Skin Lesions with 3D stereovision camera system: validation and clinical applications>>, SKIN RESEARCH AND TECHNOLOGY, vol 19, No 1, 20 février 2013 (2013-02-20), pages e182-e190, XP055139368, ISSN: 0909-752X, DOI:10.1111/j.1600-0846.2012.00625.x, as well as in the case of the 3D LifeViz II camera as described in the report <<Exhibition Watch Report—In-Cosmetics 2013>>, 2013, XP055139703, Paris, page 8 et 9. All these systems are reducing much of the artefacts due to specular spots but are strongly reducing the light in the images because of light attenuation due to the polarization filters which is far from ideal.

A fairly reduced number of other stereophotogrammetry cameras are using two separated flashes not to reduce reconstruction artefacts due to specular reflection but in order to reduce casted shadows on the subject. The device described in the Japanese patent JP 2001 290227 A ((MINOLTA CO LTD) 19 Oct. 2001 (2001-10-19) or the camera <<Holga>> as described in <<The Holga Manual>>, 2011, pages 1-39, XP055140095 are two such systems. These camera systems are not equipped with computation means enabling 3D surface reconstruction and therefore are not adapted to the use of the dual flash to reduce specular reflection.

BRIEF SUMMARY OF THE INVENTION

The principle of the present invention is based on the discovery that having two light sources separated by the same distance as the two optics of a double optics, without polarization and aligned with the optics and by using a conveniently designed 3D surface reconstruction algorithm, it is possible to reduce 3D reconstruction artefacts due to specular reflection of the light sources.

In fact, using two light sources according to the invention is creating 4 virtual positions in 3D for the reconstruction of a specular point. FIGS. 5A, 5B, 5C and 5D are illustrating these four positions. In FIGS. 5A, 5B, 5C and 5D, S is the subject, OA and OB are the two optics of the dual optics, 2A and 2B are the two light sources with 2A aligned with optics OA and 2B aligned with optics 2B and 5 is the unique camera body.

FIG. 5A is presenting the point AA-AB reconstructed from the images of the light source 2A as seen by optics OA and OB.

FIG. 5B is presenting the point BA-BB reconstructed from the images of the light source 2B as seen by optics OA and OB.

FIG. 5C is presenting the point AB-BA reconstructed from the image of the light source 2A as seen by optics OB and the image of the light source 2B as seen by the optics OA.

FIG. 5D is presenting the point AA-BB reconstructed from the image of the light source 2A as seen by optics OA and the image of the light source 2B as seen by the optics OB.

Only configuration of FIG. 5C is leading to a reconstructed point AB-BA which is situated within or very close to the actual surface of subject S. In order to reconstruct correctly the 3D surface, the 3D reconstruction algorithm needs to determine the right pairing between the four pairing possibilities, that is, solution AB-BA corresponding to the configuration of FIG. 5C.

One way to perform this selection is to consider between the four possible corresponding points relative to a specular spot the point closest to the device in case of a convex surface or the farthest in the case of a concave surface. Our experiments have shown that thanks to the invention, unexpectedly good results are obtained for the reconstruction of 3D surfaces with specular reflection without any specific modifications to 3D reconstruction methods except in the case when choosing a point amongst the four possible solutions based on such geometric criterion.

BRIEF DESCRIPTION OF THE SEVERAL VIEWS OF THE DRAWING

FIG. 1 is presenting the well-known principle of stereoscopy reconstruction.

FIG. 2 is presenting a photography camera with a unique body and a double optics made with a set of mirrors and a unique light source and corresponds to the state of the art.

FIG. 3 is presenting a photography camera with a unique body and a double optics made with two separate sets of lenses and one unique light source and is also part of the state of the art.

FIG. 4 is presenting the technical issue that the invention is intended to solve.

FIGS. 5A, 5B, 5C and 5D are illustrating how the invention is helping to solve the technical issue.

FIG. 6 is presenting one implementation of the invention making use of primary and secondary mirrors used for the building of the double optics.

FIG. 7 is presenting one implementation of the invention making use of two independent sets of lenses.

FIG. 8 is presenting one implementation of the invention where the two independent light sources are replaced by a single light source and a set of mirrors.

FIG. 9 is presenting one instance of the invention where the light sources, although shifted relative to the two optics, are remaining in the alignment of the optics and the subject, which is making still possible to use the invention.

DETAILED DESCRIPTION OF THE INVENTION

The present invention is presenting a device intended to improve 3D surface reconstruction algorithms for stereo-photogrammetry by reducing the reconstruction artefacts due to specular reflections on the subject.

As an exemplary implementation, it is comprised of a computing unit enabling 3D surface reconstruction by pairing corresponding points between two images of a stereo pair, a photographic camera body with a double optics without polarization and two separated light sources having the same separation distance than the double optics and aligned with the double optics relative to the subject.

The alignment is such that if the two optics are separated according to a given axis, the alignment between the optical source and the corresponding optics is made according to a line perpendicular to the axis between the two optics. Hence, if the axis between the two optics is horizontal as is the case for human vision, the alignment between each light source and its corresponding optics is vertical. The two light sources are placed as close as possible from the optics, while avoiding any shadow casted from the camera body or optics on the subject as well as avoiding the light sources to cast light directly inside the optics.

The computing unit is programmed in such a way that a selection is made between the four possible ways to match specular points by choosing the solution which is the closest to the device for a convex surface and the solution which is the farthest from the device for a concave surface.

According to other implementations of the invention:
The two light sources can be placed both either upper or under the optics without changing the principle of the invention.
The double optics can be made by using a set of mirrors.
The double optics can be made by using two independent sets of lenses.
The image produced by each of the two optics can be acquired via a unique photosensitive sensor or by two separate photosensitive sensors.
The acquisition of each image of each optics and the activation of each light source can be made sequential in such a way that the optics combinations are restricting the pairing to the only combination leading to the reconstruction of a specular point on the surface of the subject.
The two light sources can be made by using one single light source and a set of mirrors enabling the creation of two virtual light sources placed according to the invention.
The two light sources can be slightly displaced according to device manufacturing constraints and to avoid stray light as long as each light source is kept in alignment with the corresponding optics relative to the subject.

Figure 9:
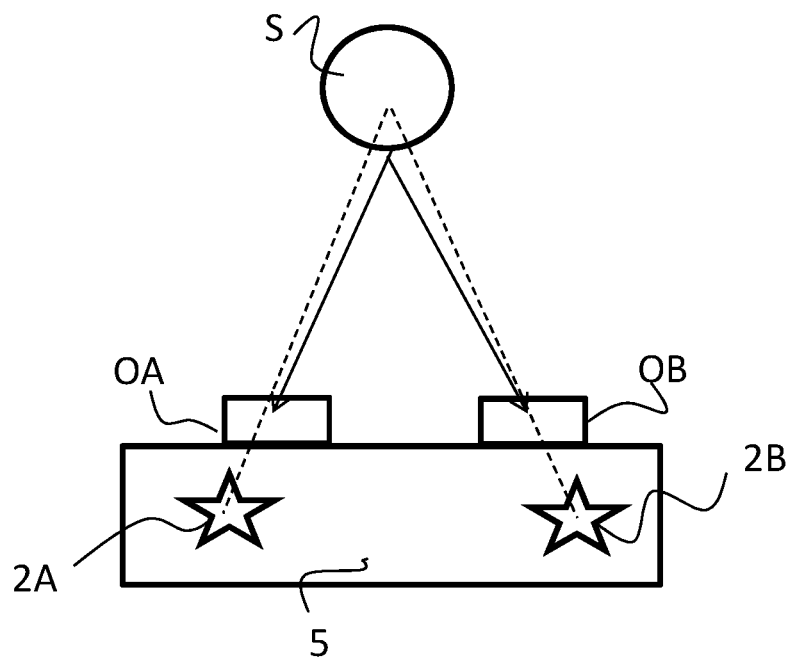

Relative to the drawing and more specifically FIG. 9, the device is including a computing unit (not represented) enabling the reconstruction of a 3D surface via the matching of corresponding points from the two images of a stereo pair, a unique photography camera body 5, two non-polarized optics OA an OB topped respectively by a light source 2A and a light source 2B.

Figure 6:
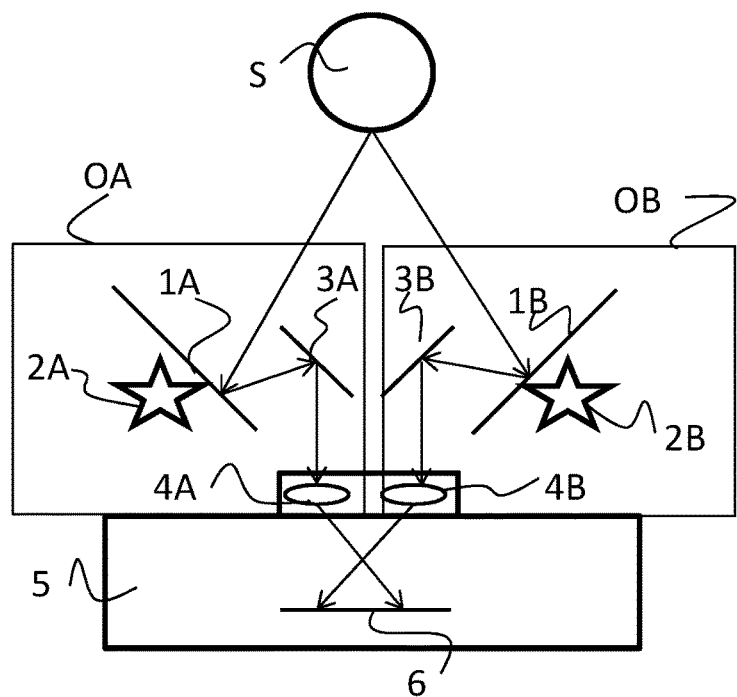
FIGS. 6 to 9 are illustrating different implementations of the invention. More specifically.

According to the arrangement described in FIG. 6, the double optics system can be built by using an image splitter made of mirrors. The split can be made with two secondary mirrors 1A and 1B placed sideways and receiving each the image of the subject and with mirror 1A reflecting the image to a primary mirror 3A and mirror 1B reflecting the image to a primary mirror 3B. The primary mirrors 3A and 3B are reflecting the images toward a photosensitive surface 6 through a set of lenses 4A for the mirror 3A and a set of lenses 4B for the mirror 3B. In this arrangement, the optics OA is constituted mainly of the mirrors 1A and 3A and of the set of lenses 4A, and the optics OB is constituted mainly of the mirrors 1B and 3B and of the set of lenses 4B. According to this arrangement, the light source 2A is aligned vertically with the center of the mirror 1A and the light source 2B is aligned vertically with the mirror 1B. According to a specific arrangement of the invention the sets of lenses 4A and 4B is replaced by a single set of lenses 4. The photographic surface itself can be unique 6 or be constituted of two distinct photosensitive surfaces 6A and 6B, each receiving one of the two images of the stereo pair.

Figure 7:
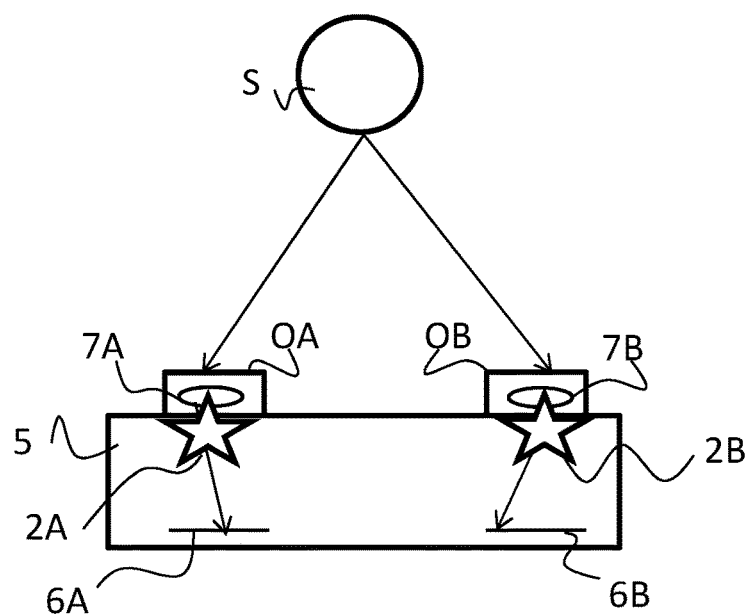

According to another arrangement presented in FIG. 7, the double optics can be made of two sets of independent sets of lenses 7A and 7B, each receiving and sending back an image on a photosensitive surface 6 without necessitating the use of a set of mirrors to separate each image of the stereo pair. According to this arrangement, the light source 2A is aligned vertically with the set of lenses 7A and the light source 2B is aligned vertically with the set of lenses 7B. In this case also, the photosensitive surface 6 can be unique or be constituted of two separate photosensitive surfaces 6A and 6B receiving each one of the two images of the stereo pair.

Figure 1:
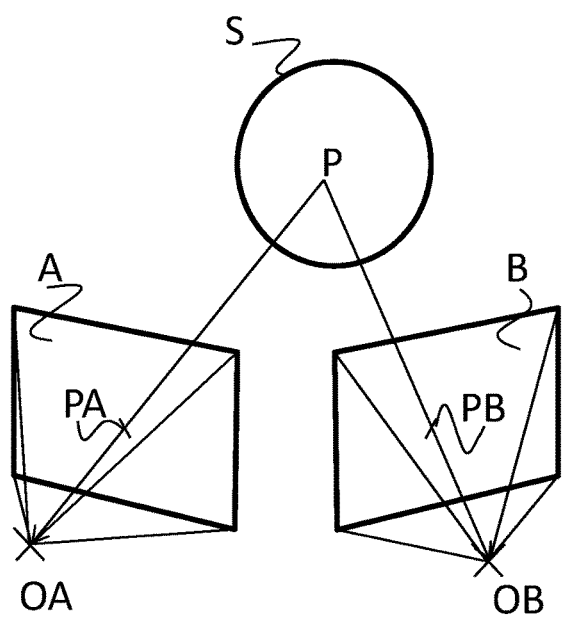
FIGS. 1 to 4 are intended to explain the state of the art and are illustrating the technical issue which is intended to be solved by the invention.
Figure 2:
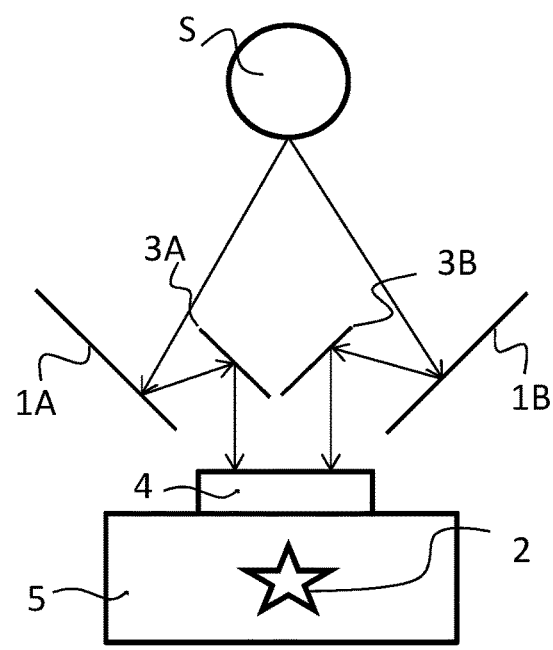
Figure 3:
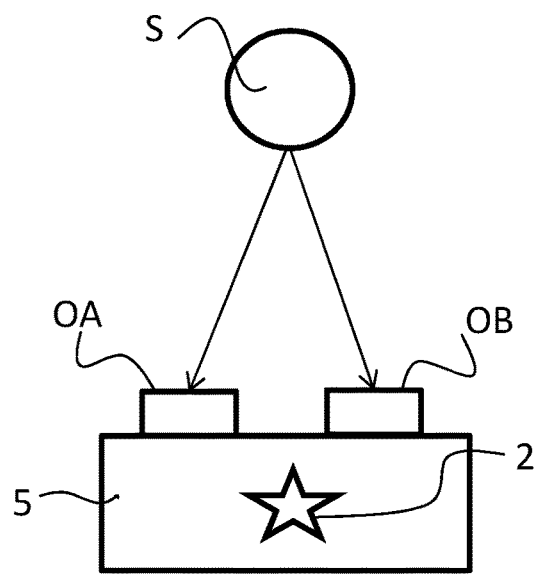
Figure 4:
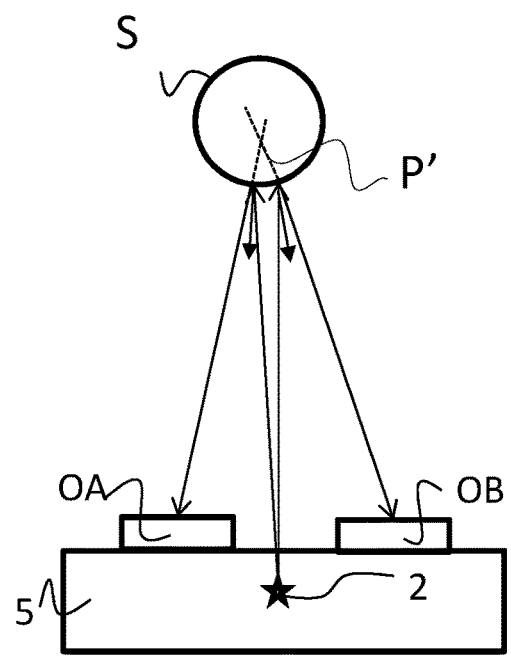
Figure 5A:
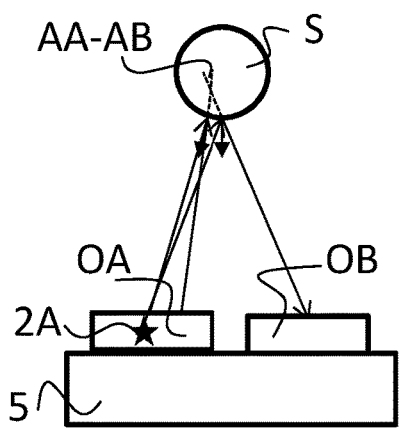
FIGS. 5A, 5B, 5C and 5D are detailing how the technical issue is solved by the invention.
Figure 5B:
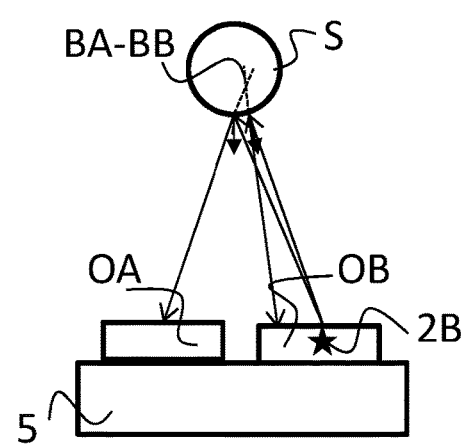
Figure 5C:
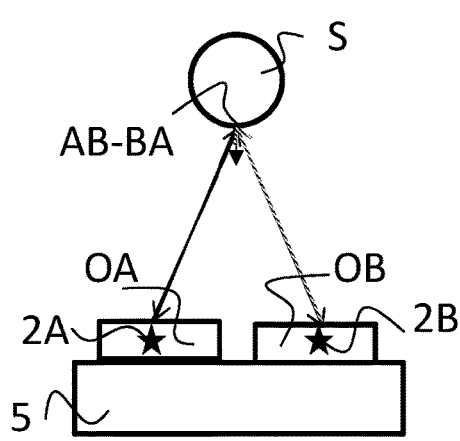
Figure 5D:
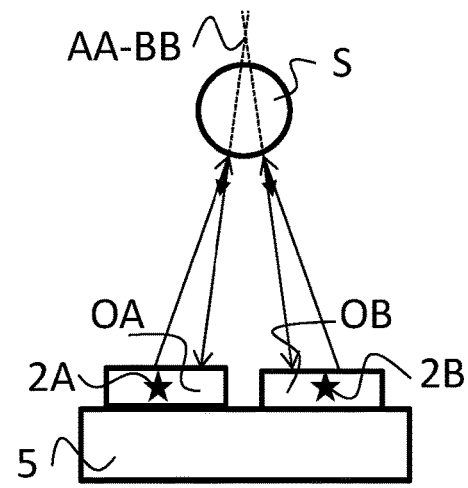

According to another arrangement the configurations AA-AB, BA-BB and AA-BB respectively from FIGS. 5A, 5B and 5D are physically eliminated by ensuring that the light source 2A is illuminating only the optics OB and the light source 2B is illuminating only the optics OA, leaving only the configuration AB-BA of FIG. 5C. A way to implement this arrangement is to acquire the two images of the stereo pair asynchronously by using as a first step the light source 2A to take solely the image using optics OB and then, as a second step, by using the light source 2B to take the picture with the optics OA.

In the case of all arrangements, the alignment between the light source 2A and optics OA on one side and the alignment of light source 2B and optics OB on the other side are approximate without the invention being compromised. Indeed, the farther the subject from the camera device and the less sensitive the alignments between light sources and optics are in order for the surface to be accurately reconstructed.

Other arrangements than these described in FIGS. 6 and 7 are possible in order to realize the invention, making use, for example of a single set of lenses instead of two in the case of the image splitter of FIG. 6 or making use of a single photosensitive surface in the case of two separate sets of lenses of FIG. 7 without the invention being compromised.

Figure 8:
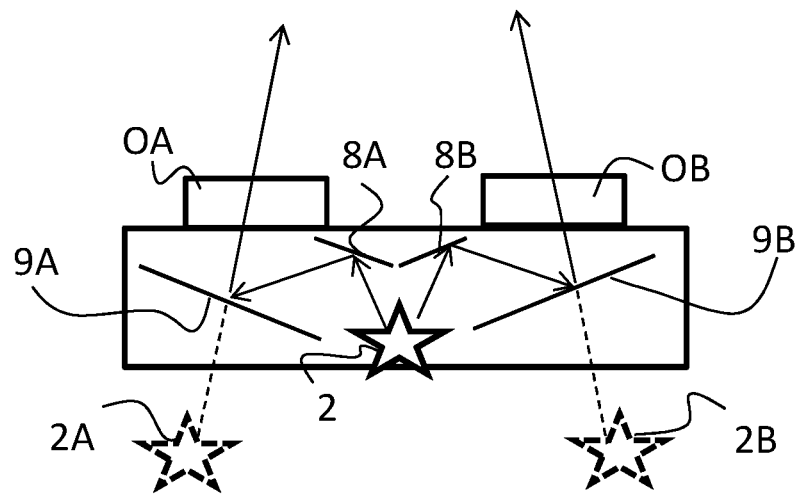

A particularly clever arrangement described in FIG. 8 is to use a splitter to separate a single light source 2 in two virtual light sources 2A and 2B, with 2A and 2B being separated of the appropriate distance. One way to implement this arrangement is to use a set of mirrors equivalent to the set of mirrors used to separate the image, but placed this time in front of the single light source 2. The light from the main light source 2 is reflecting into the primary mirrors 8A and 8B which are opposed to it and is then reflected to secondary mirrors 9A and 9B which are redirected light toward the subject S. To our knowledge, there exists no such stereo-photogrammetry system making use of such arrangement made of a double optics and a light splitter based on mirrors and able to create two virtual sources spread with the same distance as the double optics, which is constituting in itself an invention enabling at the same time to reduce shadows in the stereo pair and to reduce artefacts due to specular effects while having an easier device to manufacture and which is constituting a separate claim in the present patent application as it does not need a computing unit to be implemented.

In any of the arrangements, if the light sources are placed slightly behind the double optics, it could be useful to increase slightly the distance between the two light sources so that the two axes of alignment between the light sources and the optics are converging to a point corresponding to the expected distance to the subject S. It must be observed that the placement of the light sources does not need to be exact for the invention to work as the two light sources have a given extension in space and as the expected position of the subject itself is approximate. Such an arrangement is an optimization of the placement of the light sources according to the distance between the two optics, their positions in space and the expected position of the subject as it is shown in FIG. 9.

The present device is particularly intended for the acquisition of stereo pairs in stereophotogrammetry for the reconstruction of surfaces in three dimensions.

What is claimed is:

1. A stereophotogrammetry device for 3D surface reconstruction from a pair of images comprising:
   a computing unit (C) enabling three dimensional surfaces reconstruction by matching corresponding points between each of the two images of a stereo pair; and
   a unique camera body (5) equipped with a system of non-polarized double optics (OA) and (OB) and of two separated light sources (2A) and (2B) being separated of the same distance as the double optics and aligned with this double optics in such a way that (2A) is aligned with (OA) and (2B) is aligned with (OB) relative to subject (S),
   wherein the computing unit (C) is enabling to determine amongst the 4 possible pairing for the reconstruction of a specular spot the geometric position which is the closest to the device in the case of a convex surface and to the farthest to the device for a concave surface.

2. The device of claim 1, wherein the two light sources (2A) and (2B) are placed just above the double optics (OA) and (OB) respectively.

3. The device of claim 1, wherein the two light sources (2A) and (2B) are placed just below the double optics (OA) and (OB) respectively.

4. The device according to one of claims 1 to 3 wherein the double optics is constituted of a set of two secondary mirrors (1A) and (1B), each collecting the image of the subject (S) and reflecting the image toward a set of primary mirrors (3A) and (3B) in opposition to the set of secondary mirrors and reflecting these two images through one or several lenses (4A) and (4B) toward a photosensitive surface (6) enabling the recording of the two images as a stereo pair.

5. The device of claim 4 wherein the two images reflected by the set of primary mirrors are focalized by a unique set of lenses on the photosensitive surface (6).

6. The device according to claim 4 wherein the two images reflected by the primary mirrors are focalized on two distinct photosensitive surfaces (6A) and (6B).

7. The device according to one of the claims 1 to 3 wherein the double optics is made of two distinct sets of lenses (7A) and (7B) without using a set of mirrors for splitting the images and where the two images are focalized on two distinct photosensitive surfaces (6A) and (6B).

8. The device according to one of the claims 1 to 3 wherein the double optics is made of two distinct sets of lenses (7A) and (7B) without using a set of mirrors for splitting the images and where the two images are focalized on one single photosensitive surface (6).

9. The device according to claim 1 wherein as a first step light source (2A) is activated and the corresponding image is acquired solely by the optics (OB) and as a second step light source (2B) is activated and the corresponding image is acquired solely by the optics (OA).

10. The device according to claim 1 wherein the two light sources (2A) and (2B) are created by a unique light source (2) whose light is reflected by a set of primary mirrors (8A) and (8B) opposed to the light source (2) and projected on a set of secondary mirrors (9A) and (9B) opposed to the primary mirrors (8A) and (8B) and where the secondary mirrors are projecting the light toward the subject (S), creating two virtual light sources (2A) and (2B) according to the invention.

11. The device according to claim 1 wherein the light sources (2A) and (2B) are placed slightly behind the double optics (OA) and (OB) and separated by a distance slightly larger than the objectives (OA) and (OB) of the double optics in such a way that the axis (2A)-(OA) and (2B)-(OB) are converging to a point corresponding to the expected distance of the subject.

12. A stereo photography device comprising a unique camera body (5) equipped with a system of double optics (OA) and (OB) and a unique light source (2) wherein the light of the light source (2) is reflected by a set of primary mirrors (8A) and (8B) opposed to the light source (2) and projecting the light on a set of secondary mirrors (9A) and (9B) opposed to the primary mirrors (8A) and (8B) and where the secondary mirrors are projecting the light toward the subject (S) creating two virtual light sources (2A) and (2B) separated of a distance close to the distance between (OA) and (OB).

* * * * *